United States Patent
Park et al.

(10) Patent No.: US 9,537,751 B2
(45) Date of Patent: Jan. 3, 2017

(54) DIVIDED HIERARCHICAL NETWORK SYSTEM BASED ON SOFTWARE-DEFINED NETWORKS

(71) Applicant: KULCLOUD, Seongnam-si, Gyeonggi-do (KR)

(72) Inventors: Suengyoung Park, Yongin-si (KR); Dipjyoti Saikia, Seongnam-si (KR); Seokhwan Kong, Yongin-si (KR); Jimin Lee, Seoul (KR); Nikhil Malik, Seongnam-si (KR)

(73) Assignee: KULCLOUD, Seongnam-si, Gyeonggi-do (KR)

( * ) Notice: Subject to any disclaimer, the term of this patent is extended or adjusted under 35 U.S.C. 154(b) by 0 days.

(21) Appl. No.: 14/890,056

(22) PCT Filed: Mar. 31, 2014

(86) PCT No.: PCT/KR2014/002749
§ 371 (c)(1),
(2) Date: Nov. 9, 2015

(87) PCT Pub. No.: WO2015/152435
PCT Pub. Date: Oct. 8, 2015

(65) Prior Publication Data
US 2016/0087872 A1    Mar. 24, 2016

(51) Int. Cl.
*H04L 12/24* (2006.01)
*H04L 12/64* (2006.01)
(Continued)

(52) U.S. Cl.
CPC .............. *H04L 45/02* (2013.01); *H04L 12/24* (2013.01); *H04L 12/6418* (2013.01); *H04L 67/34* (2013.01)

(58) Field of Classification Search
CPC ...... H04L 12/24; H04L 12/6418; H04L 45/02; H04L 67/34
See application file for complete search history.

(56) References Cited

U.S. PATENT DOCUMENTS 6,061,349 A * 5/2000 Coile ................... H01R 31/005
370/389
9,225,597 B2 * 12/2015 Tubaltsev ............... H04L 45/02
(Continued)

OTHER PUBLICATIONS

International Search Report for PCT/KR2014/002749 mailed Dec. 15, 2014 from Korean Intellectual Property Office.
(Continued)

*Primary Examiner* — Joe Chacko
(74) *Attorney, Agent, or Firm* — Paratus Law Group, PLLC

(57) ABSTRACT

A divided hierarchical network system based on software-defined networks, the divided hierarchical network system including: an edge controller configured to: generate forwarding information in response to a flow forwarding inquiry from a lower level and respond to the request with the forwarding information; generate mapping information such that each of a plurality of edge ports of each of a plurality of switches that form the lower level corresponds to each of a plurality of virtual ports of one virtual switch; if it is not possible to generate forwarding information in response to a request received from a lower level for forwarding a flow that comprises edge ports, query forwarding information to an upper level regarding a flow in which the edge port is converted into a corresponding virtual port based on the mapping information.

4 Claims, 10 Drawing Sheets

(51) Int. Cl.
*H04L 12/751* (2013.01)
*H04L 29/08* (2006.01)

(56) References Cited

U.S. PATENT DOCUMENTS

| | | | |
|---|---|---|---|
| 2013/0044636 A1* | 2/2013 | Koponen | H04L 47/12 370/254 |
| 2013/0058208 A1* | 3/2013 | Pfaff | H04L 12/4633 370/217 |
| 2013/0060819 A1 | 3/2013 | Lambeth et al. | |
| 2013/0103817 A1* | 4/2013 | Koponen | G06F 9/45558 709/223 |
| 2013/0132531 A1* | 5/2013 | Koponen | H04L 41/0823 709/220 |
| 2013/0163427 A1* | 6/2013 | Beliveau | H04L 67/327 370/235 |
| 2013/0211549 A1 | 8/2013 | Thakkar et al. | |
| 2013/0318243 A1* | 11/2013 | Chinthalapati | H04L 45/52 709/226 |
| 2013/0322443 A1* | 12/2013 | Dunbar | H04L 12/185 370/390 |
| 2013/0329601 A1* | 12/2013 | Yin | H04L 45/02 370/254 |
| 2014/0247753 A1* | 9/2014 | Koponen | H04L 45/64 370/255 |
| 2015/0263946 A1* | 9/2015 | Tubaltsev | H04L 45/02 370/392 |

OTHER PUBLICATIONS

Stefan Schmid et al. 'Exploiting locality in distributed SDN control'. New York, USA: ACM, 2013, ISBN 978-1-4503-2178-5, pp. 121-126.
Boughzala, B. et al. 'OpenFlow supporting inter-domain virtual machine migration'. In; Wireless and Optical Communications Networks (WOCN), 2011 English international Conference, Paris, May 24-26, 2011, pp. 1-7.
OpenFlow Switch Specification, Oct. 14, 2013, version 1.4.0(Wire Protocol 0x05), The Open Networking Foundation.
Software-Defined Networking: The New Norm for Networks, Apr. 13, 2012, ONF White Paper, The Open Networking Foundation.
Written Opinion of the International Searching Authority for PCT/KR2014/002749 mailed from ISA/KR on Dec. 15, 2014.

* cited by examiner (a)

(b)

(c)

(a)

(b)

(c)

(b)

DIVIDED HIERARCHICAL NETWORK SYSTEM BASED ON SOFTWARE-DEFINED NETWORKS

CROSS REFERENCE TO PRIOR APPLICATION

This application is a National Stage Patent Application of PCT International patent application No. PCT/KR2014/002749 (filed on Mar. 31, 2014) under 35 U.S.C. §371, which is hereby incorporated by reference in their entirety.

BACKGROUND

1. Field

The following description relates to a divided hierarchical network system based on software-defined networks, which is capable of dividing a network into smaller networks and hierarchically operating the divided networks in order to improve scalability and flexibility of an SDN-based network.

2. Description of the Related Art

The hardware-oriented development of a network environment makes it difficult to actively and flexibly respond to a network change, and to achieve scalability. Even there is a case where compatibility between vendors or between different models of devices from the same vendor is not ensured. Thus, software-defined network (SDN) technology to divide data plane and control plane and OpenFlow protocol have gained growing attention as alternative technologies, and currently there are many applications to use-cases.

As the network environment has been complicated, more improved security, automation, and scalability are required, and the SDN-based network may be an architecture that can satisfy such demand. However, the number of switches that a controller of control plane can manage is inevitably limited. Such limitation may degrade the scalability and flexibility of the network environment.

RELATED ART DOCUMENTS

[Non-Patent Documents]

1. OpenFlow Switch Specification version 1.4.0 (Wire Protocol 0x05), Oct. 14, 2013

[https://www.opennetworking.org/images/stories/downloads/sdn-resources/onf-specifications/openflow/openflow-spec-v1.4.0.pdf]

2. Software-Defined Networking: The New Norm for Networks, ONF White Paper, Apr. 13, 2012

[https://www.opennetworking.org/images/stories/downloads/sdn-resources/white-papers/wp-sdn-newnorm.pdf]

SUMMARY

The following description relates to a network system with a divided structure based on software-defined network, which can divide the entire network into smaller networks and hierarchically manage the divided networks.

Also, the following description relates to a network system that can set division requirements, thereby reducing an error due to network division, and allow a controller to only manage a topology of its directly connected lower network, thereby reducing load to each controller.

In one general aspect, there is provided a divided hierarchical network system based on software-defined networks, the divided hierarchical network system including an edge controller configured to: generate forwarding information in response to a flow forwarding inquiry from a lower level and respond to the request with the forwarding information; generate mapping information such that each of a plurality of edge ports of each of a plurality of switches that form the lower level corresponds to each of a plurality of virtual ports of one virtual switch; if it is not possible to generate forwarding information in response to a request received from a lower level for forwarding a flow that comprises edge ports, query forwarding information to an upper level regarding a flow in which the edge port is converted into a corresponding virtual port based on the mapping information.

In another general aspect, there is provided a software-defined network (SDN)-based network system including: an orchestrator; a route controller; and a plurality of switches, wherein the orchestrator is configured to comprise: a topology abstraction unit configured to set a single switch or a predetermined number or less of switches connected to each other as a single edge divided network; and an edge controller generating unit configured to generate an edge controller that controls the edge divided network, wherein a first edge controller generated by the edge controller generating unit is configured to comprise: a topology managing unit to manage a topology of a first edge divided network that is at a lower level of the first edge controller; an entry managing unit configured to generate forwarding information in response to a flow forwarding inquiry from a lower level and respond to the request with the forwarding information; a mapping unit configured to generate mapping information such that each of a plurality of edge ports of each of a plurality of switches that form the lower level corresponds to each of a plurality of virtual ports of one virtual switch; and a converter unit configured to, if it is not possible to generate forwarding information in response to an inquiry received from a lower level for forwarding a flow that comprises edge ports, query forwarding information to an upper level regarding a flow in which the edge port is converted into a corresponding virtual port based on the mapping information.

Other features and aspects will be apparent from the following detailed description, the drawings, and the claims.

DETAILED DESCRIPTION

The present invention now will be described more fully hereinafter with reference to the accompanying figures, in which embodiments of the invention are shown.

It will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

When an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. In addition, it is understood that when a first element is connected to or accesses a second element in a network, the first element and the second element can transmit and receive data therebetween.

In the following description, usage of suffixes such as 'module' or 'unit' used for referring to elements is given merely to facilitate explanation of the present invention, without having any significant meaning by itself Thus, the 'module' and 'unit' may be used together.

When the elements described herein are implemented in the actual applications, two or more elements may be combined into a single element, or one element may be subdivided into two or more elements, as needed.

Figure 1:
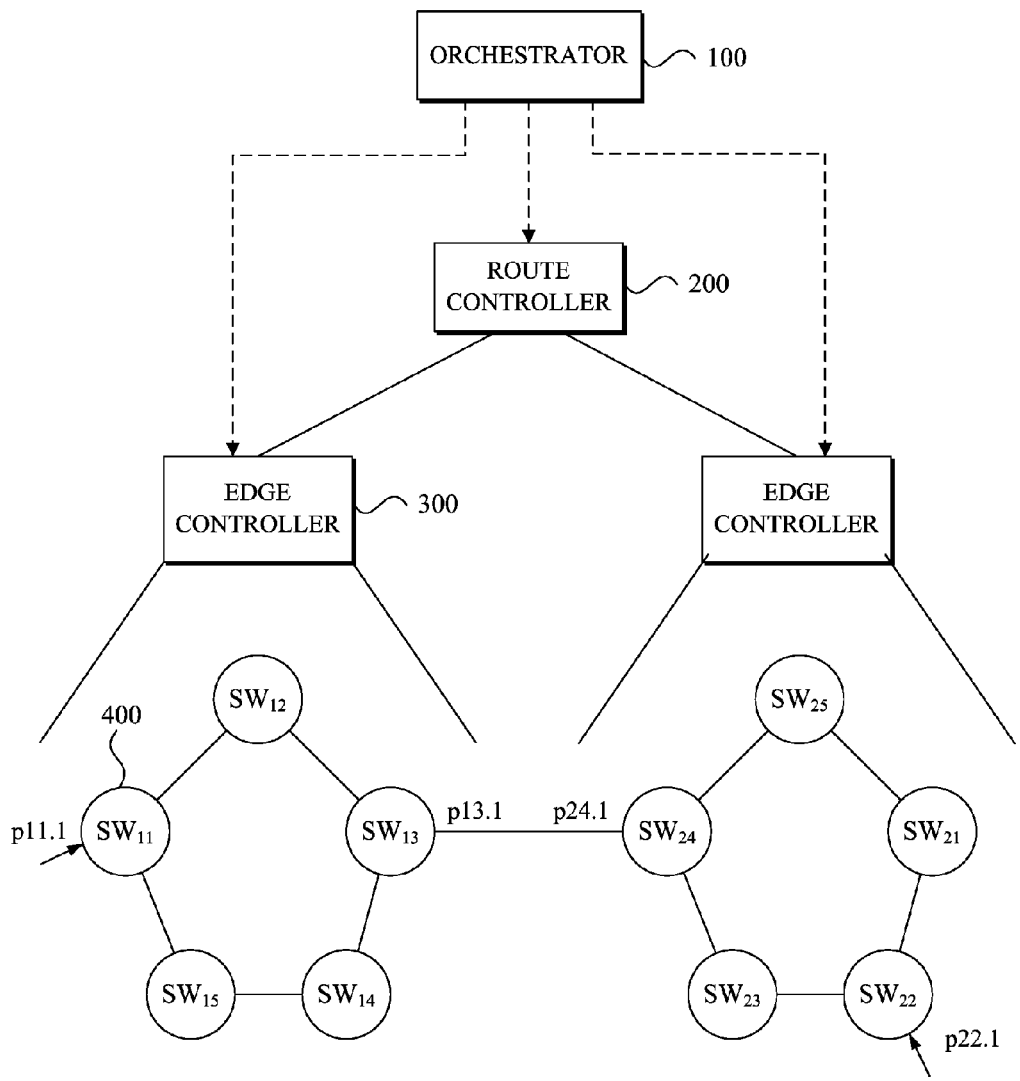
FIG. 1 is a block diagram illustrating a software-defined network-based network system according to an exemplary embodiment.
Figure 2:
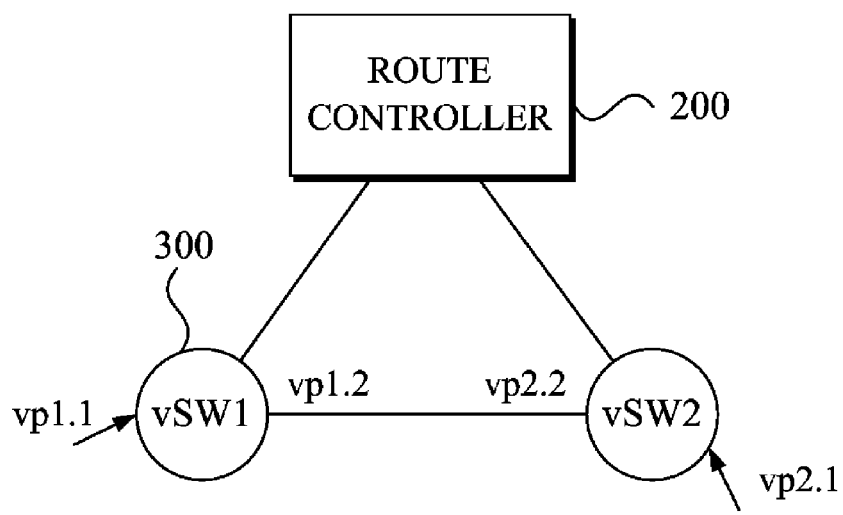
FIG. 2 is a block diagram illustrating a network system abstract of the network system of FIG. 1.
Figure 3:
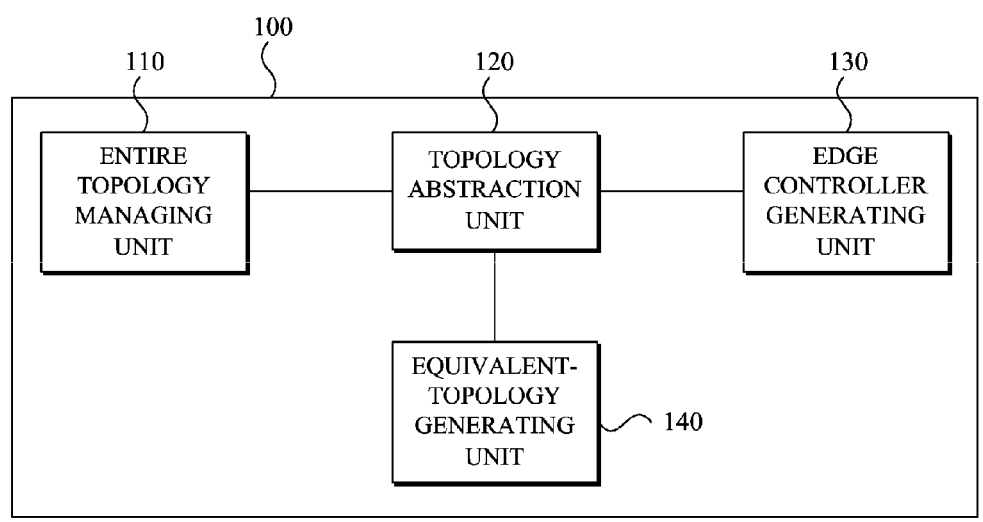
FIG. 3 is a block diagram illustrating an orchestrator of the network system of FIG. 1.
Figure 4:
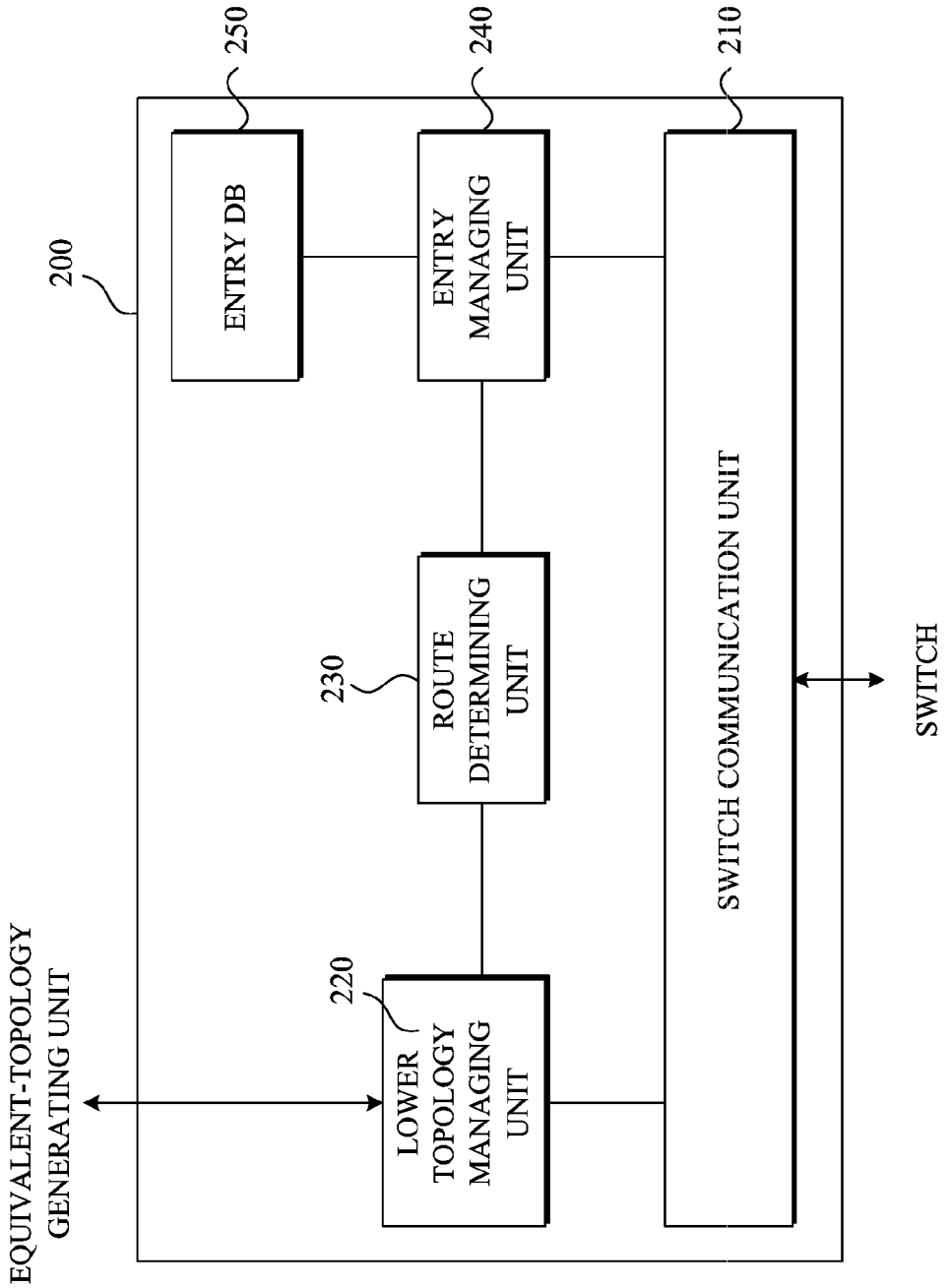
FIG. 4 is a block diagram illustrating a route controller of the network system of FIG. 1.
Figure 5:
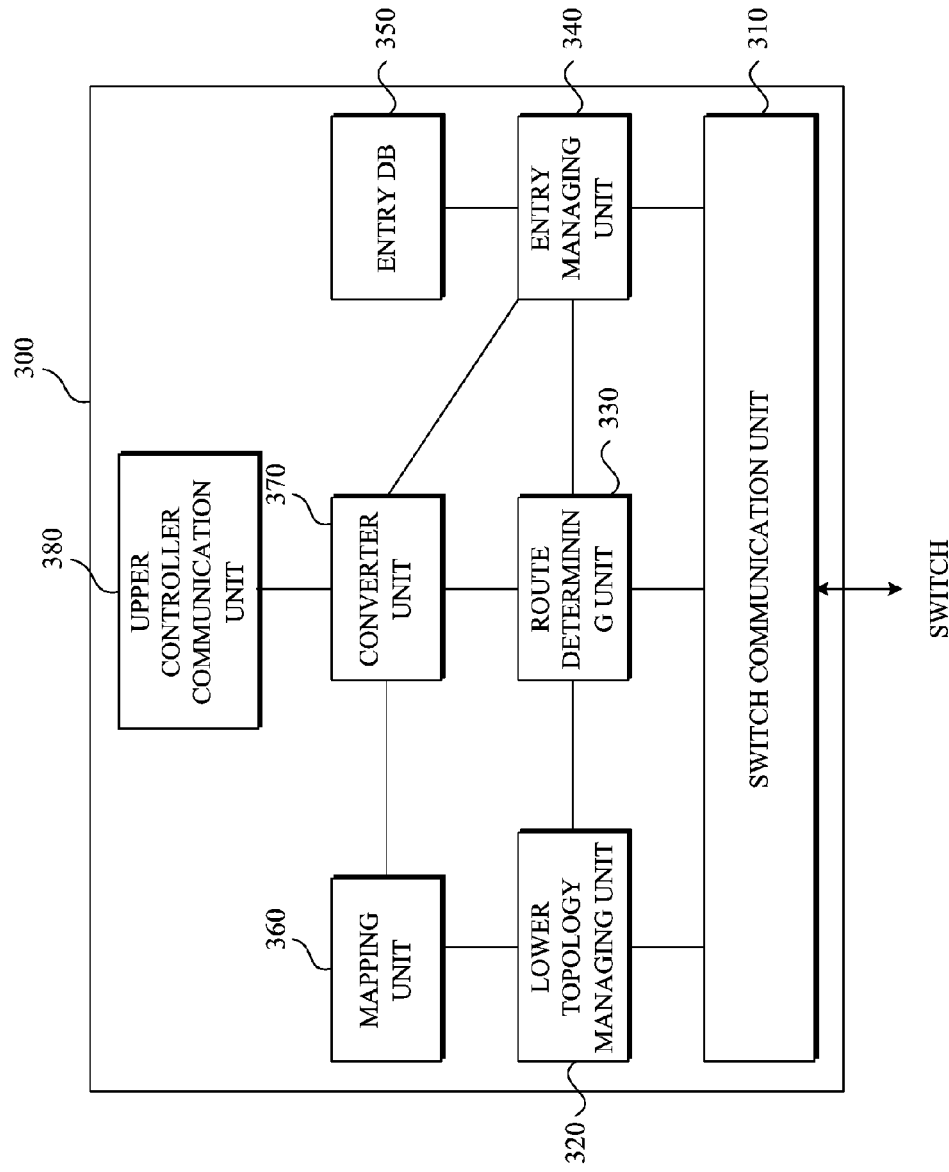
FIG. 5 is a block diagram illustrating an edge controller of FIG. 1.

FIG. 1 is a block diagram illustrating a software-defined network-based network system according to an exemplary embodiment of the present disclosure, FIG. 2 is a block diagram illustrating a network system abstract of the network system of FIG. 1, FIG. 3 is a block diagram illustrating an orchestrator of the network system of FIG. 1, FIG. 4 is a block diagram illustrating a route controller of the network system of FIG. 1, and FIG. 5 is a block diagram illustrating an edge controller of FIG. 1.

Referring to FIG. 1, the network system may include an orchestrator 100, a route controller 200, one or more edge controllers 300, and one or more switches 400.

Referring to FIGS. 1 and 2, the edge controller 300 of the network system may act as a general controller relative to switches at a lower level, and may act as a switch relative to a controller (i.e., the route controller 200) in a higher level.

The switch 400 may be a physical switch or a virtual switch. Each switch 400 may process a received packet and relay a flow between network devices (not shown). The switch 400 may include a flow table. The switch 400 may include a multi-flow table to process OpenFlow pipelines of OpenFlow specifications.

The flow table may include a flow entry that defines rules about how to process a flow of a network device (not shown). The network device may include a terminal device to and from which the network system intends to transmit and receive data or information, or a physical device or a virtual device that executes a particular function.

From the viewpoint of one switch, the flow may refer to a series of packets that share at least one value of a header field, or a packet flow on a particular path according to a combination of various flow entries of multiple switches. The OpenFlow network may perform path control, crash recovery, load distribution and optimization in units of flow.

The switches 400 may be divided into edge switches (including ingress switches and egress switches) of a flow and core switches between the edge switches, according to the combination of the multiple switches.

The flow entry of the flow table may include tuples such as a match field that describes conditions (comparison rules) for matching with a packet, a counter that is updated upon the existence of a matched packet, a time out that specifies a time before flow is expired by the switch, an opaque-type cookie that is selected by the controller, instructions to change a packet specified in the entry, update an action set, and update metadata, actions to deliver a packet to a designated port or several ports, a priority field, and so forth.

The switch 400 may extract flow information from a packet received as user traffic. The flow information may contain ingress port that is a packet incoming port of an edge switch of a packet, packet header information (IP addresses of a transport source and a destination, a MAC address, a port, VLAN information, etc.), and metadata. The metadata may be selectively added from a previous table, or be added from another switch. The switch 400 may search for a flow entry associated with a received packet with reference to the extracted flow information. In response to finding the flow entry, the switch 400 may process and manipulate the received packet according to process rules (actions or instructions). If it fails to search for a flow entry, the switch 400 may transmit the received packet or minimum data of the received packet to a controller in a higher level to inquiry the flow process, and query the flow processing, and may receive a response with a flow entry from the controller.

As the network environment has been complicated, more improved security, automation, and scalability are required, and the SDN-based network may be an architecture that can satisfy such demand. However, the number of switches that a controller of control plane can manage is inevitably limited. Such limitation may degrade the scalability and flexibility of the network environment. In this regard, the present disclosure provides the network system that divides the entire network into smaller networks, and hierarchically manages the divided networks, while specifying division requirements, thereby reducing errors due to network division, and allowing most controllers to only manage a topology of its directly connected lower network, thereby reducing load to each controller.

Referring to FIG. 3, the orchestrator 100 may include an entire topology managing unit 110, a topology abstraction unit 120, and an edge controller generating unit 130. While in the present exemplary embodiment, the orchestrator 100 and the route controller 200 are separately described, the route controller 200 may take the place of functions of the orchestrator 100.

The entire topology managing unit 110 may configure network topology information based on connection relationship between the entire actual switches 400, and manage information of the entire topology. The entire topology managing unit 110 may monitor the connection status of all actual switches. Here, the actual switches may include virtual switches, as well as physical switches. However, the actual switch may refer to a switch that is disposed on a data plane and performs only switching function, and may not include a virtual switch as an edge controller incorporating functions of a switch and a controller as described below. To prevent any confusion as to what is referred to by the term "virtual switch," the actual switch is assumed as a physical switch.

The entire topology managing unit 110 may collect the connection relationship or connection status of physical switches from the route controller 200 or the edge controller 300. The entire topology managing unit 110 may communicate with the edge controller 300 to receive port-map information about a virtual port that corresponds to an actual port that will be described below.

The topology abstraction unit 120 may divide all or part of the entire topology into edge divided networks, based on the information of the entire topology. The edge divided network may be hierarchically structured.

There may be no limitation on conditions for division commencement by the topology abstraction unit 120. For example, the network may be initially established while dividing it into edge divided networks, or the division of a network into the edge divided networks may be carried out when the size of the network reaches a predetermined threshold point.

The edge controller generating unit 130 may generate the edge controller 300 that controls the edge divided network created by the topology abstraction unit 120. The edge controller 300 will be described in detail below. For flexibility and convenience of management, the edge controller 300 may be preferably a virtual machine (VM) which is virtually generated, rather than a physical device.

The topology abstraction unit 120 and the edge controller generating unit 130 may restrict the establishment of the edge divided networks and generation of the edge controller.

For example, restrictions may apply to a linked network in which devices functioning as a switch within the edge divided network are directly connected to each other. For another example, restriction may not apply to a multi-link between two edge divided networks. In the present exemplary embodiment, physical switches SW 11 to SW 15 are established into one edge divided network by the topology abstraction unit 120, and physical switches SW 21 to SW 25 are established into another edge divided network. The edge controller generating unit 130 generates edge controllers vSW1 and vSW2, allowing them to manage the respective edge divided networks.

Figure 10:
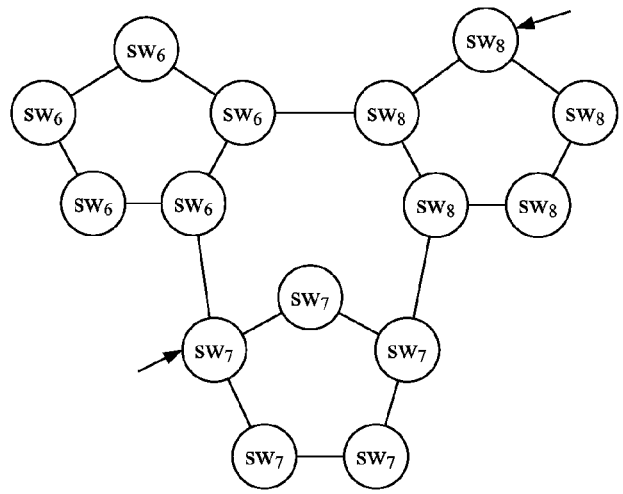
FIG. 10 illustrates an example of a network topology.
Figure 10:
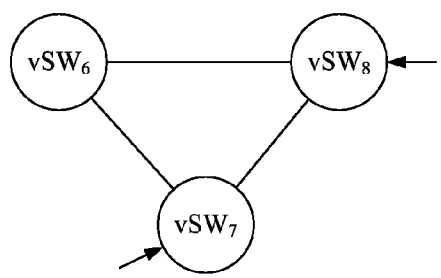
Figure 10:
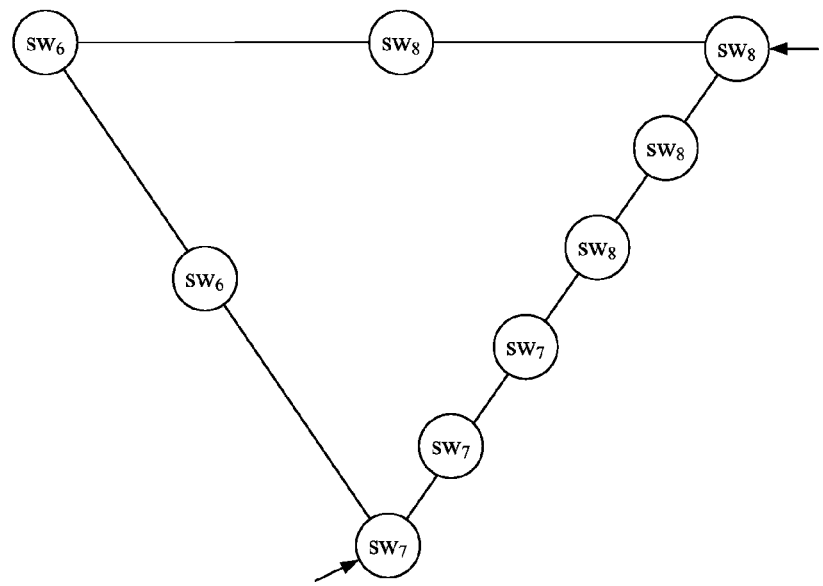

The orchestrator 100 may further include an equivalent-topology generating unit 140. The equivalent-topology generating unit 140 may be used to search for an optimized path between two nodes, particularly, the minimum hop. In the present exemplary embodiment, the route controller 200 cannot access the information of inner topology of the edge controller 300. FIG. 10 shows an example of a network topology. For example, referring to FIG. 10, FIG. 10(*a*) illustrates an entire network topology of physical switches sw6 to sw8, and FIG. 10(*b*) illustrates a topology consisting of edge controllers vSW6 to vSW8 and being abstracted from the entire topology of FIG. 10(*a*). From the viewpoint of the route controller, the minimum hop from switch vSW7 in a lower level to switch vSW8 is vSW7->vSW8. However, in light of the entire topology, the minimum hop path is vSW7->vSW6->vSW8. Therefore, to correct such discrepancy, it is required for the equivalent-topology generating unit 140 to generate an equivalent topology.

The equivalent-topology generating unit 140 may monitor whether a structure in which the edge divided networks form a loop, based on the information of the entire topology. In a case where the edge divided networks form a loop, the equivalent-topology generating unit 140 may establish an equivalent topology of physical switches of the edge divided networks belonging to the loop.

The equivalent-topology generating unit 140 may receive port map information about a virtual port of the edge controller 300, which will be described below, and a corresponding actual port from the edge controller 300. Identification information of the edge port of the equivalent topology may be converted into identification information of a virtual port based on the port map information. The port map information may be received through communications between the entire topology manger 110 and the edge controller 300, rather than communications between the equivalent topology generating unit 140 and the edge controller 300.

The equivalent topology information converted from the identification information of the edge port may be transmitted to the route controller 200.

In the present exemplary embodiment, as controllers, the route controller 200 and the edge controller 300 are described. Such controllers may act as a general controller in an SDN network system. The route controller 200 may manage at least one edge controller 300 in a lower level, and the edge controller 300 may control at least one physical switch in a lower level or at least one lower edge controller. The reference of the edge controller and the route controller may relatively vary according to the level where the controller is present, and unless otherwise explicitly stated, the route controller is assumed to manage at least one edge controller immediately below the top level.

The controllers in the SND network system are control programs that control the SDN system, providing various complicated functions, for example, routing, policy declaration, and security check. The controller may define a packet flow that is generated in a plurality of switches in a lower level. With respect to a flow authorized by the network policy, the controller may calculate a path for the flow with reference to the network topology, and control an entry of the flow to be set in the switch on the path. The controller may communicate with a switch using a particular protocol, for example, OpenFlow protocol. A communication channel between the controller and the switch may be encrypted by SSL.

Referring to FIG. 4, the route controller 200 may include a switch communication unit 210 to communicate with a switch in a lower level, a lower topology managing unit 220, a route determining unit 230, an entry managing unit 240, and an entry database (DB) 250 that stores flow entries.

The lower topology managing unit may establish and manage topology information of a network under direct control thereof based on the collected connection relationship between switches in a lower level. In the present exemplary embodiment, a switch in a lower level that communicates with the switch communication unit 210 may be the edge controller 300. The lower topology managing unit 220 may receive the equivalent-topology information from the equivalent-topology generating unit 140 of the orchestrator 100, and manage the received equivalent-topology information. In the examples illustrated in FIGS. 1 and 2, the information of the entire topology may relate to a topology of switches SW11 to SW 15 and switches SW21 to SW25. Since the entire topology does not have a structure of a loop consisting of edge divided networks, the equivalent topology is not established. A lower topology from the viewpoint of the route controller 200, that is, a topology managed by the lower topology managing unit 220 is a topology configured by device vSW1 and vSW2 of FIG. 2. FIG. 10(*a*), FIG. 10(*b*), and FIG. 10(*c*) illustrate topologies of the entire network, a lower network, and an equivalent topology, respectively.

The path calculation unit 230 may obtain a transmission path of packets which are received through the switch communication unit 210 and an action row to be executed on a switch on the transmission path, based on the network topology information established by the topology managing unit 220.

The entry managing unit 240 may register the calculation result from the path calculation unit 230 as a flow entry in the entry DB 250, and respond to a flow entry or a request for adding or updating entries from the lower level switch.

Referring to FIG. 5, the route controller 200 may include a switch communication unit 310 to communicate with a switch in a lower level, a lower topology managing unit 320, a route determining unit 330, an entry managing unit 340, an entry DB 350 to store flow entries, a mapping unit 360, a converter unit 370, and an upper controller communication unit 380 to communicate with a controller in an upper level controller.

The lower topology managing unit 320 may establish and manage topology information of a network under direct control thereof, based on the connection relationship between the lower level switches which is collected through the switch communication unit 310. In FIG. 1, the information about the lower topology that is managed by the lower topology managing unit 320 of the edge controller 300 SW1 may relate to a topology configured by switches SW11 to SW15.

The path calculation unit 330 may obtain a transmission path of packets that are received through the switch communication unit 310 and an action row to be executed on a switch on the transmission path, based on the network topology information established by the topology managing unit 320.

The entry managing unit 340 may register the calculation results from the path calculation unit 330, as flow entries in the entry DB 350, and respond to a flow entry or a request for adding or updating entries from a lower level switch.

In response to the orchestrator 100 generating an edge controller, the mapping unit 360 may convert an edge divided network into one virtual switch, and convert an edge port of the edge divided network into a virtual port of the converted virtual switch. Referring to FIGS. 1 and 2, edge controller SW1 may generate identification information vSW1 of a virtual switch through the mapping unit 360 in order to enable a lower network of SW11 to SW15 to appear as a single virtual switch, and then convert actual edge port p11.1 on a virtual switch vSW1 into vp1.1. The mapping unit 360 may generate and manage mapping information associated with identification information of an actual port and identification information of a virtual port. The mapping unit 360 may transmit the mapping information upon request from the orchestrator 100.

The converter unit 370 may convert the actual port information of the packet received from the path calculation unit 330 into virtual port information using the mapping information from the mapping unit 360. The converter unit 370 may query forwarding information related to the converted packets to the upper level controller (in this example, the route controller 200) through the upper controller communication unit 380.

The converter unit 370 may convert a forwarding message of the route controller 200 which is received through the control communication unit 380 or virtual port information of a flow entry into the actual port information using the mapping information. The entry converted by the converter unit 370 may be stored in the entry DB 350 by the entry managing unit 340.

Figure 6:
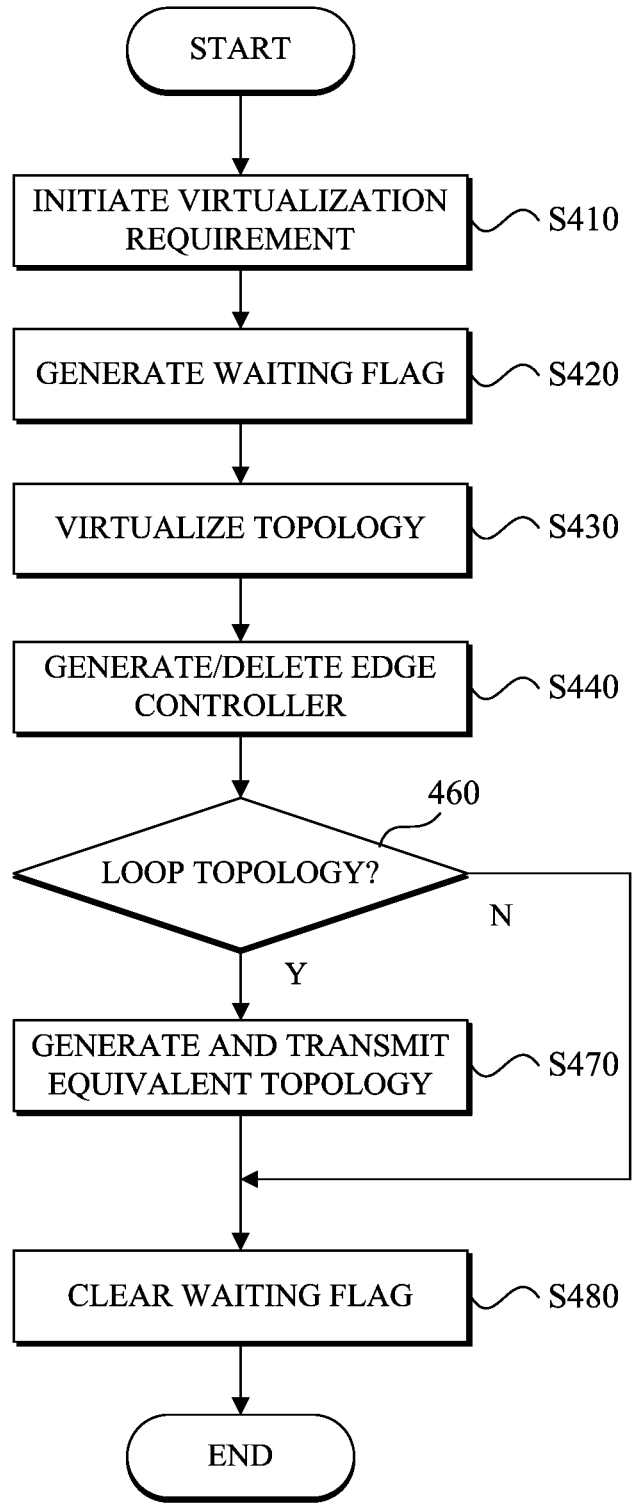
FIG. 6 is a flowchart illustrating an SDN network virtualization method of an orchestrator according to an exemplary embodiment.

FIG. 6 is a flowchart illustrating an SDN network virtualization method of an orchestrator according to an exemplary embodiment.

Referring to FIG. 6, the orchestrator 100 may virtualize the entire network according to predefined requirements in S410. If the network establishment is one of the predefined requirements, in response to an entire topology managing unit 110 of the orchestrator 100 detecting the establishment of a switch 400, a topology abstraction unit 120 may abstract the switch, and the edge controller generating unit 130 may generate an edge controller 300 in S430. If the virtualization of the existing network is one of the predefined requirements, the topology abstraction unit 120 of the orchestrator 100 may determine, based on the entire topology information of the entire topology managing unit 110, whether to commence the abstraction according to the number of switches. If there are more than the minimum number of switches 400, the topology abstraction unit 120 may set, for example, a predetermined number of directly connected switches 400 as a single edge divided network, according to edge divided network establishment requirements. In accordance with the number of edge divided networks, the edge controller generating unit 130 may generate or delete the edge controller 300.

The topology abstraction unit 120 of the orchestrator 100 may generate a waiting flag and broadcast it to the entire network while commencing the abstraction in S420. This is because an error can be prevented during the path calculation only when the establishment of the edge divided network is completed.

In response to the virtualization commence requirements and edge divided network requirements being satisfied, the topology abstraction unit 120 may virtualize the edge divided network in S430.

The edge controller generating unit 130 may generate an edge controller 330 and connect it to the generated edge divided network, or delete an edge controller 300 of the deleted edge divided network in S440.

An equivalent-topology generating unit 140 may monitor whether there is a structure in which edge divided networks form a loop, based on the entire topology information in S460. In the existence of such loop structure, the equivalent-topology generating unit 140 may generate equivalent topology information and transmit it to the route controller 200 in S470.

In response to a determination that the equivalent topology information is completely established or is not needed to be established, the orchestrator 100 may control the topology abstraction unit 120 to broadcast a waiting flag clearing message to the entire network in S480.

Figure 7:
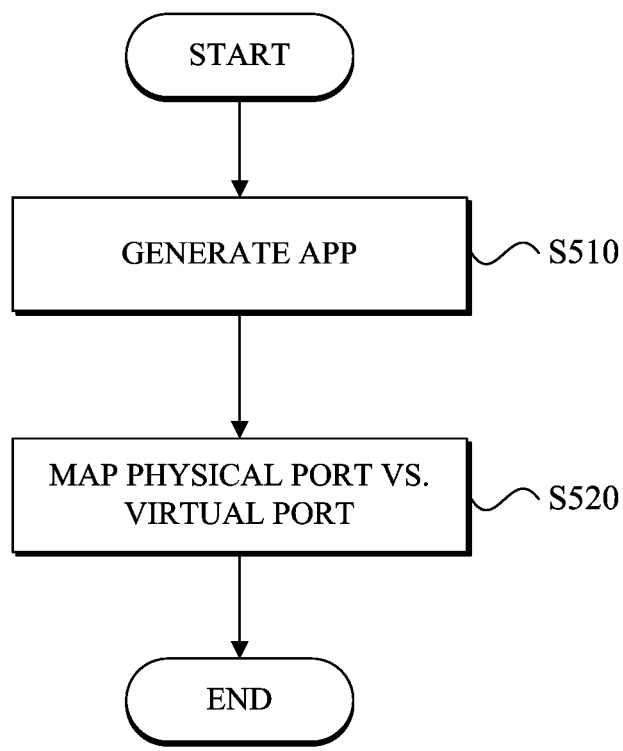
FIG. 7 is a flowchart illustrating a SDN network virtualization method of an edge controller according to an exemplary embodiment.

FIG. 7 is a flowchart illustrating a SDN network virtualization method of an edge controller according to an exemplary embodiment.

Referring to FIG. 7, when an edge controller generating unit 130 generates an edge controller 300, a necessary application may be enabled to be operated in S520. From an application for executing a function of a controller or a switch, a user request or a preset application may be enabled to be executed. In the present disclosure, elements, such as a switch communication unit, a topology managing unit, a path calculation unit, and so forth, may be operated as a kind of application.

When ready for operation, the edge controller 300 may generate virtual switch identification, convert an actual port of a virtual switch into a virtual port, and map the identification to the virtual port in S520. When the edge controller 300 is ready for operation in response to the completion of mapping, the edge controller 300 may send a completion message to the orchestrator 100 to assist in determination of waiting flag clearance.

Figure 8:
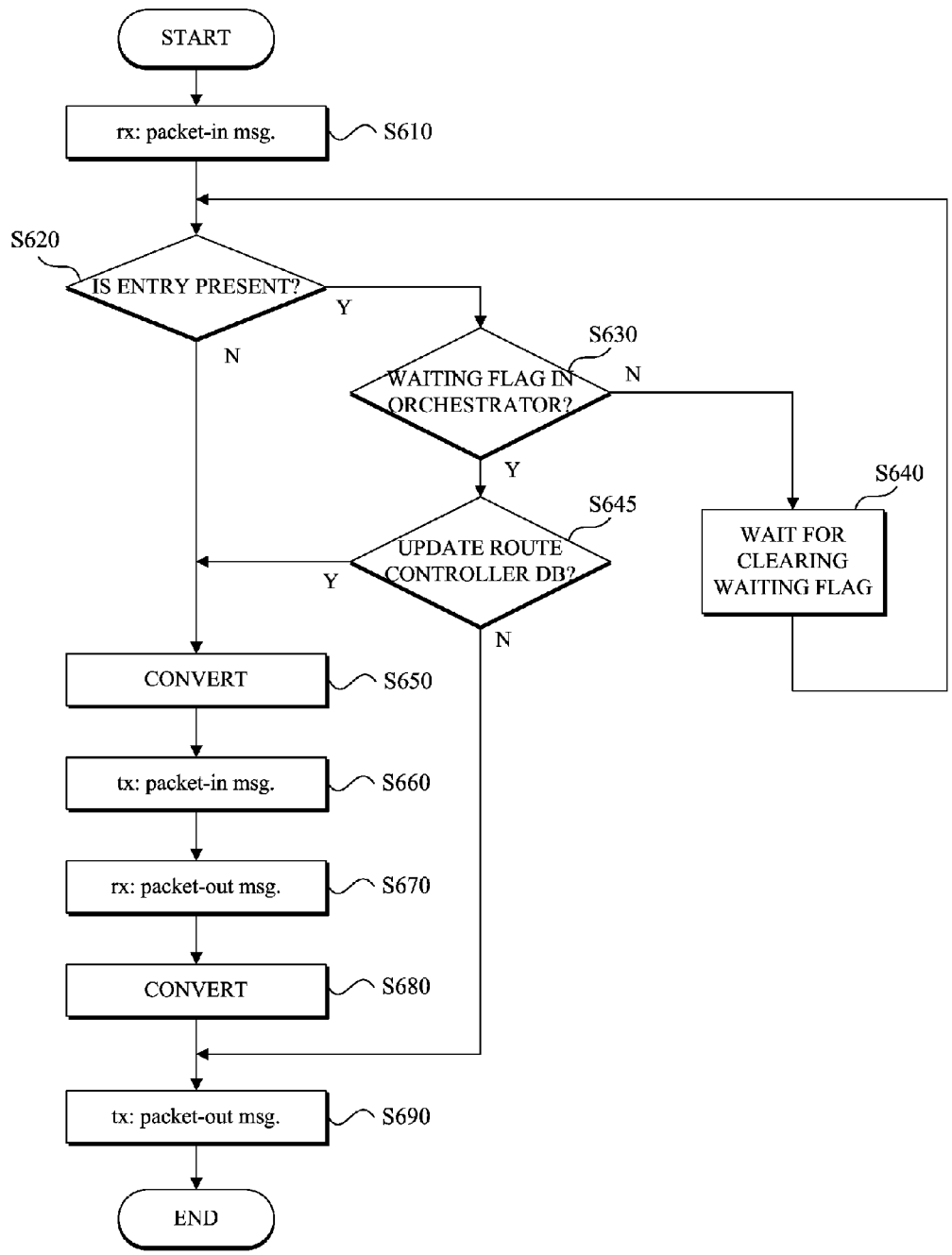
FIG. 8 is a flowchart illustrating a method of an edge controller to respond to a path request.

FIG. 8 is a flowchart illustrating a method of an edge controller to respond to a path request.

Referring to FIG. 8, the edge controller 300 may receive a packet-in message from a switch in a lower level through a switch receiver 310, wherein the packet-in message queries a packet path in S610.

The edge controller 300 may determine whether there is an entry corresponding to a packet of the packet-in message in S620.

In the presence of the corresponding entry, whether there is a waiting flag is present in the orchestrator 100 is determined in S630.

In the presence of the waiting flag in the orchestrator 100, the edge controller 300 may wait for the waiting flag to be cleared, and then determine whether there is an entry corresponding to a received packet in S620.

In the absence of the waiting flag present in the orchestrator 100, the edge controller 300 may determine whether the database of an upper level controller, that is, the route controller 200, needs to be updated in S645.

Figure 11:
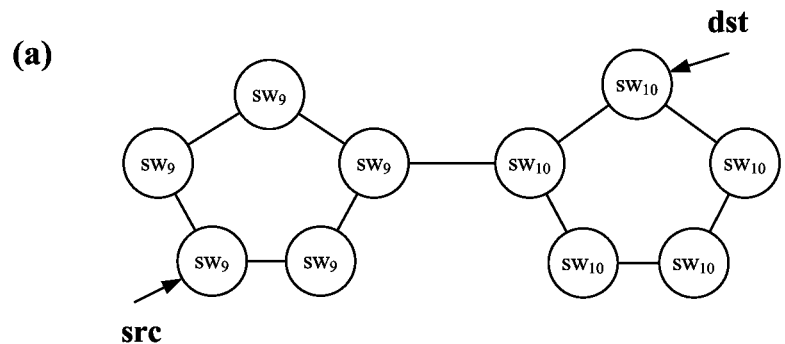
FIG. 11 is a block diagram illustrating another example of a network topology Throughout the drawings and the detailed description, unless otherwise described, the same drawing reference numerals will be understood to refer to the same elements, features, and structures. The relative size and depiction of these elements may be exaggerated for clarity, illustration, and convenience.
Figure 11:
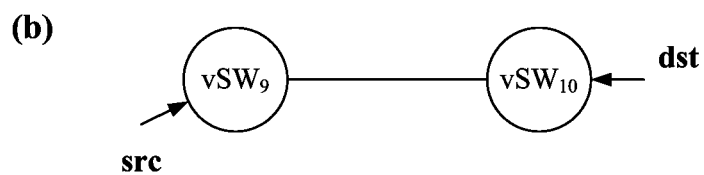
Figure 11:
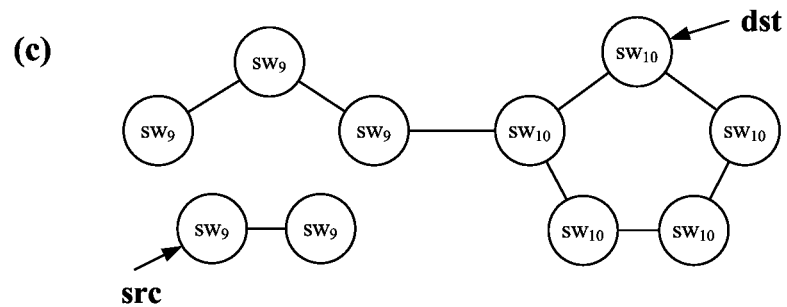
Figure 11:
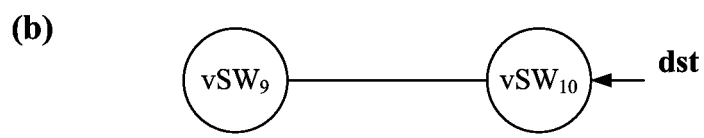
Figure 11:
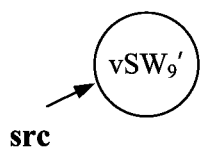

This is because, for example, if a switch connection in a lower network of the edge controller 300 is down, if the switch is reconnected after the switch down, or if a new stich is added to the lower network, a port of a virtual switch seen from the route controller 200 is changed while a lower topology of the edge controller 300 changes. FIG. 11 is a block diagram illustrating an example of a network topology. Switch SW9 group and switch sw10 group as shown in FIG. 11(a) may be virtualized into edge divided networks, respectively. In this case, the upper level controller (route controller 200) may be determined as a lower network topology as shown in FIG. 11(b). In a case where a problem occurs in a link as shown in FIG. 11(c), direction connection between the switches of the existing edge divided network (vSW9) is disconnected, so that it needs to re-construct the edge divided network. Before re-construction, the edge controller 300 queries the packet path setting to the route controller 200, the route controller 200 may respond to a flow entry with reference to a topology shown in FIG. 11(b). The edge controller 300 may issue re-inquiry to the route controller 200 since packet transmission according to the flow entry by the route controller 200 does not take place. To avoid such loop repetition, the edge controller 300 may need to determine whether to update a database of the route controller 200 regarding a topology change in a lower network.

In response to the determination in S645 that update is not needed, the edge controller 300 may send a packet-out message, through the entry DB 350, to the switch that requests the packet path in S690, wherein the packet-out message instructs the transmission of a packet to a feasible port. The edge controller 300 may send a flow mod message to a switch on the path in advance. The flow mod message may be set to be sent along with the packet-out message.

In response to the determination in S645 that update is needed, for example, if it is needed to inform a switch structure as shown in FIG. 11(d) to the route controller 200, the edge controller 300 may update its lower topology, and notify of this event to the route controller 200. In the case of FIG. 11(d), the edge controller 300 may control the route controller 200 to be seen as two switches or a new edge controller may be generated by the orchestrator 100. When the update is completed, flow entry corresponding to the received packet of the edge controller 300 does not exist any longer. In other words, this situation is the same as a case where a determination S620 is made that there is no entry corresponding to the received packet.

In response to the determination in S620 that no entry exists corresponding to the received packet, the edge controller 300 may convert an edge port of the received packet into a virtual port in S650, and then send a packet-in message to the route controller 200 in S660. In response to receiving a packet-out message from the route controller 200 in S670, the edge controller 300 may convert the virtual port in the packet-out message into an actual port S680, then calculate an optimal path based on the internal network topology information, and transmit the packet-out message to a switch that requests the packet-out message in S690. A relevant entry may be updated to the entry DB 350.

Figure 9:
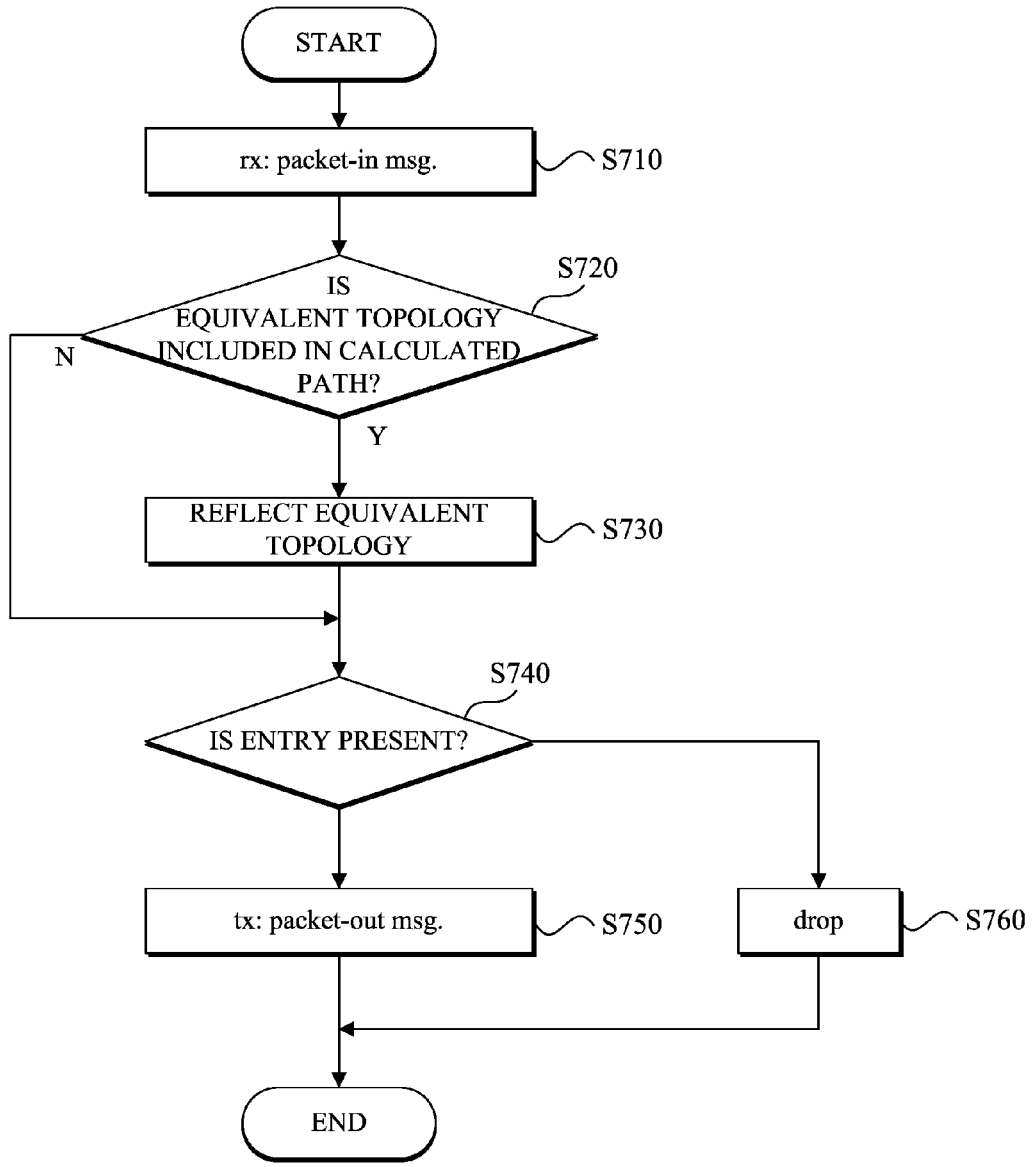
FIG. 9 is a flowchart of an SDN network virtualization method of a route controller according to an exemplary embodiment.

FIG. 9 is a flowchart of an SDN network virtualization method of a route controller according to an exemplary embodiment.

Referring to FIG. 9, the route controller 200 may receive a packet-in message from a lower level switch, that is, an edge controller 300 in S710. The router controller 200 may calculate a feasible path based on information of the packet-in message. If there is an equivalent topology in the calculated feasible path (S720), the route controller 200 may take into account the equivalent topology first in S730. The route controller 200 may determine in S740 whether there is an entry that matches with a packet of the packet-in message, if the entry is not present, transmit a packet drop message to a lower level in S760. If the entry is present, in S750, the route controller 200 may transmit a packet-out message to a switch in a lower level which requests for the packet-out message.

According to the exemplary embodiments described above, it is possible to divide the entire network into smaller networks when the division commencement requirements and division requirements are satisfied, and to hierarchically manage the divided networks. In addition, since a controller in each level only needs to manage a network in an immediate lower level, it is possible to reduce load to each controller and thus to improve security.

Furthermore, since an equivalent topology corresponding to a virtualized topology is generated and managed, it is possible to obtain an optimized path from path calculation.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A divided hierarchical network system based on software-defined networks, the divided hierarchical network system comprising:
   a hardware processor;
   a memory comprising instructions executable by the hardware processor; and
   an edge controller executable by the hardware processor and configured to:
      generate forwarding information in response to a flow forwarding inquiry from a lower level and respond to the request with the forwarding information;
      generate mapping information such that each of a plurality of edge ports of each of a plurality of switches that form the lower level corresponds to each of a plurality of virtual ports of one virtual switch;
      if it is not possible to generate forwarding information in response to a request received from a lower level for forwarding a flow that comprises edge ports, query forwarding information to an upper level regarding a flow in which the edge port is converted into a corresponding virtual port based on the mapping information, wherein the plurality of switches that form the lower level form edge divided networks which are connected to each other, wherein:
   the lower level of a route controller that responds to the forwarding information regarding a flow of the upper level comprises a plurality of edge controllers;
   at least a first to a third edge controllers among the plurality of edge controllers form a loop-type topology;
   the route controller includes information of a plurality of equivalent topologies as many as a number of hops between all nodes based on a topology of all nodes that form a lower level of the first to third edge controllers;
   edge ports of the information of the plurality of equivalent topologies are converted into virtual edge ports mapped by the first to third edge controllers; and
   the route controller takes into consideration more information of the plurality of equivalent topologies than the loop-type topology of the first to third controllers when generating the forwarding information in response to an inquiry of flow forwarding information between the virtual edge ports.

2. The divided hierarchical network system of claim 1, wherein the edge controller generates the forwarding information regarding the flow that comprises the edge ports, based on forwarding information regarding the converted flow responded from the upper level, the mapping information, and a lower level network topology, and responds with the generated forwarding information.

3. The divided hierarchical network system of claim 1, wherein the edge controller updates the mapping information in response to a switch that comprises an edge port being added to or deleted from the edge divided network.

4. The divided hierarchical network system of claim 3, wherein before updating the mapping information, the edge controller transmits a flag to the upper level and the lower level to indicate that a lower level topology is to be updated, and forwarding of a flow related to the flag for topology update is stopped.

* * * * *